US006758747B2

(12) United States Patent
Baerlocher

(10) Patent No.: US 6,758,747 B2
(45) Date of Patent: Jul. 6, 2004

(54) GAMING DEVICE INCLUDING CHOICES HAVING VARYING PROBABILITIES OF CONTRIBUTING TO GAME'S TERMINATION

(75) Inventor: Anthony J. Baerlocher, Reno, NV (US)

(73) Assignee: IGT, Reno, NV (US)

(*) Notice: Subject to any disclaimer, the term of this patent is extended or adjusted under 35 U.S.C. 154(b) by 293 days.

(21) Appl. No.: 09/957,308

(22) Filed: Sep. 20, 2001

(65) Prior Publication Data

US 2003/0054871 A1 Mar. 20, 2003

(51) Int. Cl.[7] .......................... A63F 13/00; A63F 9/24; G06F 17/00; G06F 19/00

(52) U.S. Cl. ............................ 463/16; 463/17; 463/18; 463/25; 463/42

(58) Field of Search ................................ 463/1, 15–27, 463/40–42

(56) References Cited

U.S. PATENT DOCUMENTS 4,695,053 A 9/1987 Vazquez, Jr. et al.
5,205,555 A 4/1993 Hamano
5,324,041 A 6/1994 Boylan et al.
5,342,047 A 8/1994 Heidel et al.
5,536,016 A 7/1996 Thompson
5,769,716 A 6/1998 Saffari et al.
5,788,573 A 8/1998 Baerlocher et al.
5,833,536 A 11/1998 Davids et al.
5,851,148 A 12/1998 Brune et al.
5,873,781 A 2/1999 Keane
5,947,820 A 9/1999 Morro et al.
5,964,463 A 10/1999 Moore, Jr.
5,980,384 A 11/1999 Barrie
5,984,781 A 11/1999 Sunaga
5,997,400 A 12/1999 Seelig et al.
6,004,207 A 12/1999 Wilson, Jr. et al.
6,015,346 A 1/2000 Bennett
6,033,307 A 3/2000 Vancura
6,059,289 A * 5/2000 Vancura .................. 273/143 R (List continued on next page.)

FOREIGN PATENT DOCUMENTS

EP 0945837 A2 9/1999
WO PCT/AU97/00121 9/1997

OTHER PUBLICATIONS

Top Dollar Brochure written by IGT, published in 1998.
Slot Line Advertisement including Temperature Rising game description written by IGT, published in 1998.
Bonus Spin Red, White & Blue Advertisement written by IGT, published date unknown.
Bingo Brochure written by Casino Data Systems, published in 1998.
Full House Brochure written by Anchor Games, published in 2000.
Jewel in the Crown Advertisement written by IGT, published in 2000.
Red Hot 7's Game Description written by IGT, game available prior to 2001.

*Primary Examiner*—Teresa Walberg
*Assistant Examiner*—Robert Mendoza
(74) *Attorney, Agent, or Firm*—Bell, Boyd & Lloyd LLC

(57) ABSTRACT

The present invention is a gaming device and preferably a bonus round game of a gaming device that, after setting a count initially to zero, enables an input to be sent to the processor upon a player's selection of one of a plurality of displayed choices. After receiving the input, the game randomly generates a component from a preferably weighted database associated with the choice or with the order of the selection. The game adds the generated component to the count. The game awards the player if the updated count is below a predetermined game termination condition. The game ends if the updated count satisfies the game terminating condition. The game repeats this process until the updated count satisfies the game terminating condition.

57 Claims, 6 Drawing Sheets

U.S. PATENT DOCUMENTS

| | | | |
|---|---|---|---|
| 6,089,976 | A | 7/2000 | Schneider et al. |
| 6,102,798 | A | 8/2000 | Bennett |
| 6,120,031 | A | 9/2000 | Adams |
| 6,126,542 | A | 10/2000 | Fier |
| 6,126,547 | A | 10/2000 | Ishimoto |
| 6,135,885 | A | 10/2000 | Lermusiaux |
| 6,155,925 | A | 12/2000 | Giobbi et al. |
| 6,159,095 | A | 12/2000 | Frohm et al. |
| 6,159,097 | A | 12/2000 | Gura |
| 6,159,098 | A | 12/2000 | Slomiany et al. |
| 6,162,121 | A | 12/2000 | Morro et al. |
| 6,164,652 | A | 12/2000 | Lauretta et al. |
| 6,168,520 | B1 | 1/2001 | Baerlocher et al. |
| 6,168,523 | B1 | 1/2001 | Piechowiak et al. |
| 6,173,955 | B1 | 1/2001 | Perrie et al. |
| 6,174,235 | B1 | 1/2001 | Walker et al. |
| 6,190,255 | B1 | 2/2001 | Thomas et al. |
| 6,203,429 | B1 | 3/2001 | Demar et al. |
| 6,231,445 | B1 | 5/2001 | Acres |
| 6,261,177 | B1 | 7/2001 | Bennett |
| 6,270,409 | B1 | 8/2001 | Shuster |
| 6,299,165 | B1 | 10/2001 | Nagano |
| 6,309,300 | B1 | 10/2001 | Glavich |
| 6,312,334 | B1 | 11/2001 | Yoseloff |
| 6,315,660 | B1 | 11/2001 | DeMar et al. |
| 6,315,664 | B1 | 11/2001 | Baerlocher et al. |
| 6,328,649 | B1 | 12/2001 | Randall et al. |
| 6,346,043 | B1 | 2/2002 | Colin et al. |

* cited by examiner

FIG.5A 130 142 144

| | |
|---|---|
| 0 | 30% |
| 1 | 25% |
| 2 | 20% |
| 3 | 12% |
| 4 | 8% |
| 5 | 5% |

FIG.5B 132 142 144

| | |
|---|---|
| 0 | 25% |
| 1 | 20% |
| 2 | 30% |
| 3 | 12% |
| 4 | 8% |
| 5 | 5% |

FIG.5C 134 142 144

| | |
|---|---|
| 0 | 20% |
| 1 | 25% |
| 2 | 12% |
| 3 | 30% |
| 4 | 8% |
| 5 | 5% |

FIG.6

150 152 154

| | |
|---|---|
| 2 | 30% |
| 3 | 25% |
| 4 | 15% |
| 5 | 15% |
| 10 | 10% |
| 20 | 5% |

FIG.5D 136 142 144

| | |
|---|---|
| 0 | 12% |
| 1 | 5% |
| 2 | 20% |
| 3 | 30% |
| 4 | 25% |
| 5 | 8% |

FIG.5E 138 142 144

| | |
|---|---|
| 0 | 8% |
| 1 | 5% |
| 2 | 12% |
| 3 | 20% |
| 4 | 30% |
| 5 | 25% |

FIG.5F 140 142 144

| | |
|---|---|
| 0 | 0% |
| 1 | 0% |
| 2 | 0% |
| 3 | 0% |
| 4 | 0% |
| 6 | 100% |

GAMING DEVICE INCLUDING CHOICES HAVING VARYING PROBABILITIES OF CONTRIBUTING TO GAME'S TERMINATION

CROSS-REFERENCES TO RELATED APPLICATIONS

This application relates to the following commonly owned co-pending patent applications: "GAMING DEVICE HAVING PYRAMID BONUS SCHEME," Ser. No. 09/656, 702, "GAMING DEVICE HAVING A METHOD FOR RANDOMLY GENERATING A BONUS ROUND OUTCOME," Ser. No. 09/679,251, "GAMING DEVICE HAVING A BONUS ROUND WITH MULTIPLE RANDOM AWARD GENERATION AND MULTIPLE RETURN/RISK SCENARIOS," Ser. No. 09/678,989, "GAMING DEVICE HAVING AN INDICATOR SELECTION WITH PROBABILITY-BASED OUTCOME BONUS SCHEME," Ser. No. 09/605,809, "GAMING DEVICE WITH A BONUS SCHEME INVOLVING MOVEMENT ALONG PATHS WITH PATH CHANGE CONDITIONS," Ser. No. 09/686,538, "GAMING DEVICE HAVING VALUE SELECTION BONUS," Ser. No. 09/684, 605, "GAMING DEVICE HAVING RELATED MULTI-GAME BONUS SCHEME," Ser. No. 09/688,972, "GAMING DEVICE HAVING TERMINATION VARIABLES," Ser. No. 09/966,658, "GAMING DEVICE HAVING A BONUS SCHEME WITH MULTIPLE POTENTIAL AWARD SETS," Ser. No. 09/822,697, "GAMING DEVICE HAVING OFFER ACCEPTANCE GAME WITH TERMINATION LIMIT," Ser. No. 09/822,711, and "GAMING DEVICE HAVING OFFER/ACCEPTANCE ADVANCE THRESHOLD AND LIMIT BONUS SCHEME," Ser. No. 09/838,014.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a game terminating condition and a plurality of game choices, wherein the choices have a varying probability of contributing some or all of the game terminating condition.

BACKGROUND OF THE INVENTION

Known gaming machines have go-until or do-until games in which a player has one or more opportunities to select masked bonus awards from a pattern or group of masked awards displayed to the player. When the player selects a masked award, the player receives the value of the award, and the game enables the player to select another masked award. The player selects another masked award and the process continues until the player selects a masked terminator. European Patent Application No. EP 0 945 837 A2 filed on Mar. 18, 1999 and assigned on its face to WMS Gaming, Inc. discloses a bonus scheme of this type.

In one known do-until game, the probability of selecting a game terminator is established by the total number of game terminators and the total number of selections in the pattern or group of masked awards and masked terminators. The probability of success or failure remains constant from game to game. It is desirable to provide a game that enables the player to select and achieve awards until reaching a game termination condition, wherein the selections up to the game termination condition have varying success or failure probabilities.

SUMMARY OF THE INVENTION

The present invention involves a gaming device and preferably a bonus round of a gaming device, which enables a player to accumulate awards until the processor of the gaming device randomly generates and accumulates each component of a predetermined game ending condition. The apparatus or game includes a processor and a display device connected to the processor. The display device displays a plurality of choices to the player.

The game associates an award with each choice. The game also associates a database or table with each choice, wherein the database or table includes a plurality of components having varying percentages of a game ending condition or advancement toward a game-ending condition. The game generates one of the varied components upon a player's selection of a choice. The database is preferably weighted, such that at least one component is more likely to be randomly generated than at least one other component. The game maintains a predetermined termination condition, whereby the game ends when the game generates a component or components, which alone or in combination equal or exceed the game termination condition.

In a preferred embodiment, the game termination condition is a number and a component is some fraction or portion of the number. In another embodiment, the condition is a whole shape, such as a circle, and a component is a pie shaped wedge having a certain percentage of the circumference of the circle. In both examples, the game ends when the components satisfy a condition.

The preferred embodiment of the game also includes a touch screen having separate player selectable areas that enable the player to select and input a choice. Alternatively, the game includes one or more electromechanical input devices that enable the player to select and input a choice. The game also includes an award database, which is likewise suitably weighted, whereby the processor randomly assigns an award from the database to each player selection.

In one embodiment, the display includes a path having a plurality of positions, wherein a randomly generated component or number corresponds to a change of at least one position along the path, and wherein the game termination condition corresponds to a net change of positions along the path. The display alternatively includes a plurality of components or items, wherein the randomly generated components correspond to an addition or subtraction of at least one item, and wherein the game termination condition corresponds to a net addition or subtraction of items.

In one embodiment, the game adds the generated components, e.g., numbers or items, starting from zero. After setting a count initially to zero, the game enables an input to be sent to the processor upon a player's selection of one of the displayed choices. The game randomly generates a component upon the input from a preferably weighted database associated with the selection. The game adds the generated component to the count. The game awards the player if the updated count is below the predetermined game termination condition. The game ends if the updated count is equal to or greater than the game terminating condition. The game repeats this process until the updated count is equal to or greater than the game terminating condition.

The game alternatively sets an initial non-zero count and updates the count by subtracting the generated components associated with the player's choice selections. In this embodiment, the game preferably sets the game termination condition to zero components and thereby counts down from the initial count of components to zero components. In either case, the present invention includes setting different game ending conditions in different games of the present invention.

The awards of the present invention vary in value. The game preferably randomly assigns awards to player selections. The assignments are preferably weighted, such that the game generally knows, before the assignments, which choice will be associated with which award. The game therefore contemplates enabling the player to select choices in a predetermined order, whereby the player initially selects choices that are most likely associated with a lower valued award. In a further embodiment of the present invention, the game provides awards related to the varying probability of a component contributing to the game-terminating condition. The award may be equal or unequal to the percentage of a termination condition provided by the component.

It is therefore an advantage of the present invention to provide a gaming device having a game terminating condition and a plurality of game choices, wherein the choices each produce a component having a varying probability of contributing to some or all of the game terminating condition.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIGS. 5A though 5F are schematic views of component generation databases, each having a column of game selectable components and a probability column indicating the likelihood of selection of an associated component; and FIG. 6 is a schematic view of an award generation database, having a column of game selectable awards and a probability column indicating the likelihood that an associated award is selected.

DETAILED DESCRIPTION OF THE INVENTION

Gaming Device and Electronics

Figure 1A:
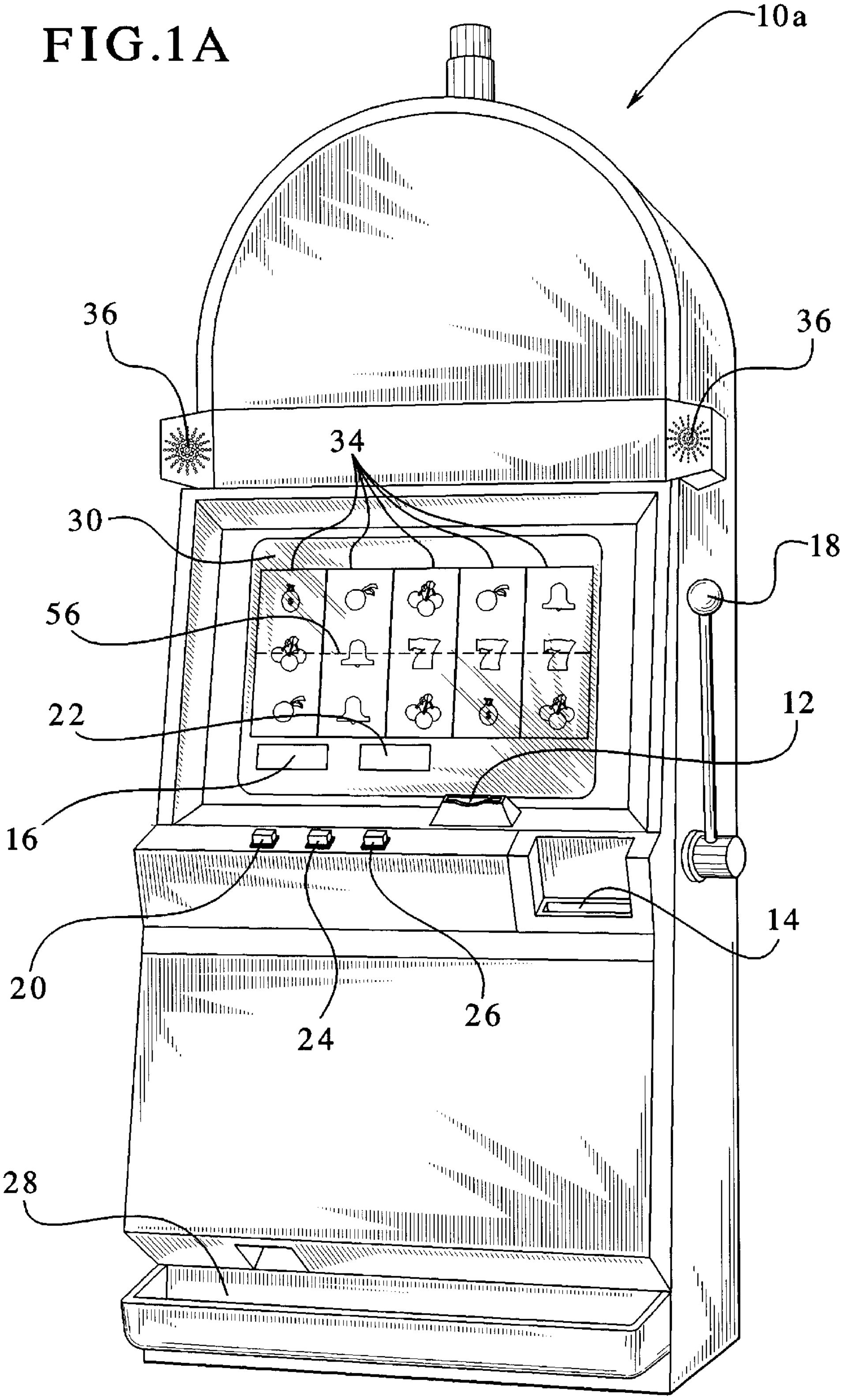
FIG. 1A is a front-side perspective view of one embodiment of the gaming device of the present invention.
Figure 1B:
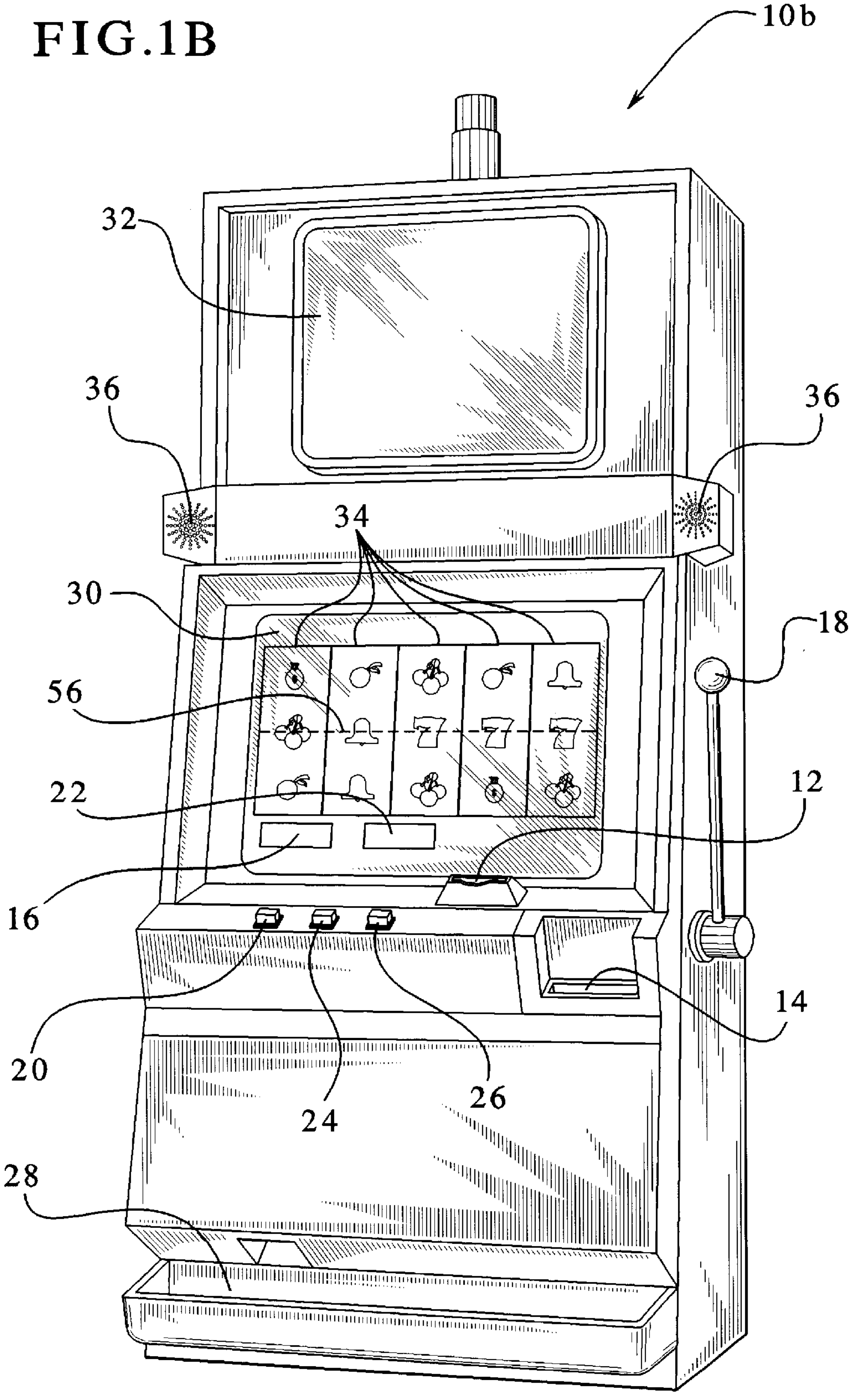
FIG. 1B is a front-side perspective view of another embodiment of the gaming device of the present invention.

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit cards, debit cards or smart cards. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, and preferably in the slot machine embodiment of the gaming device 10, includes speakers 36 for making sounds or playing music.

Figure 2:
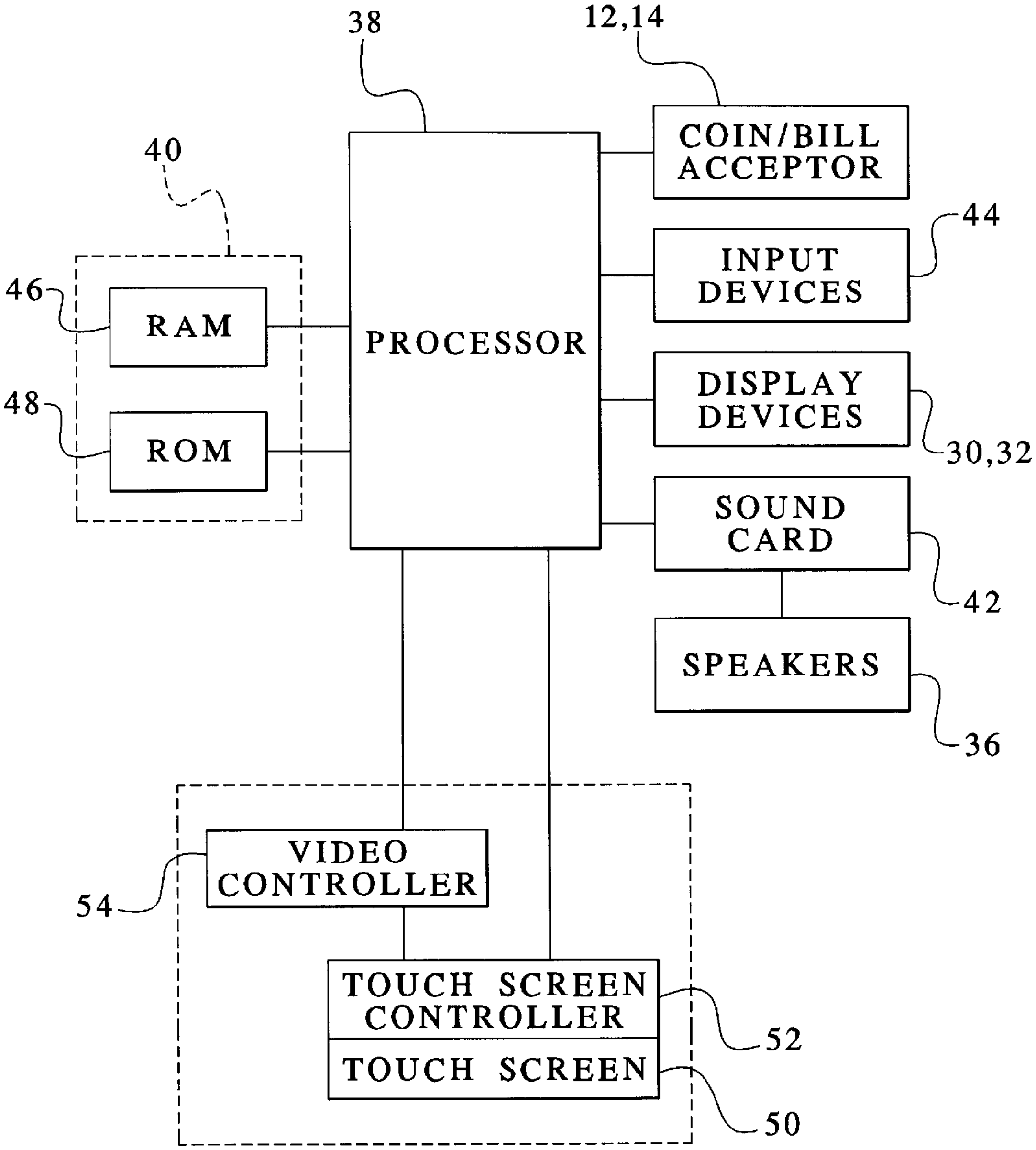
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or the "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. A player can make decisions and input signals into the gaming device 10 by touching touch screen 50 at the appropriate places. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming the device 10, the player inserts the appropriate amount of money or tokens at coin slot 12 or bill acceptor 14 and then pulls the arm 18 or pushes the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. Bonus games generally include a program that automatically begins when the player achieves a qualifying condition in the base game. The gaming device 10 preferably employs a video-based central display device 30 or 32 for the bonus round.

In the slot machine embodiment, the qualifying condition includes a particular symbol or symbol combination generated on a display device. As illustrated in the five reel slot game shown in FIGS. 1A and 1B, the qualifying condition includes the number seven appearing on three adjacent reels 34 along a payline 56. It should be appreciated that the present invention includes one or more paylines, such as payline 56, wherein the paylines can be horizontal, diagonal or any combination thereof.

Player Selection Embodiments

Figure 3:
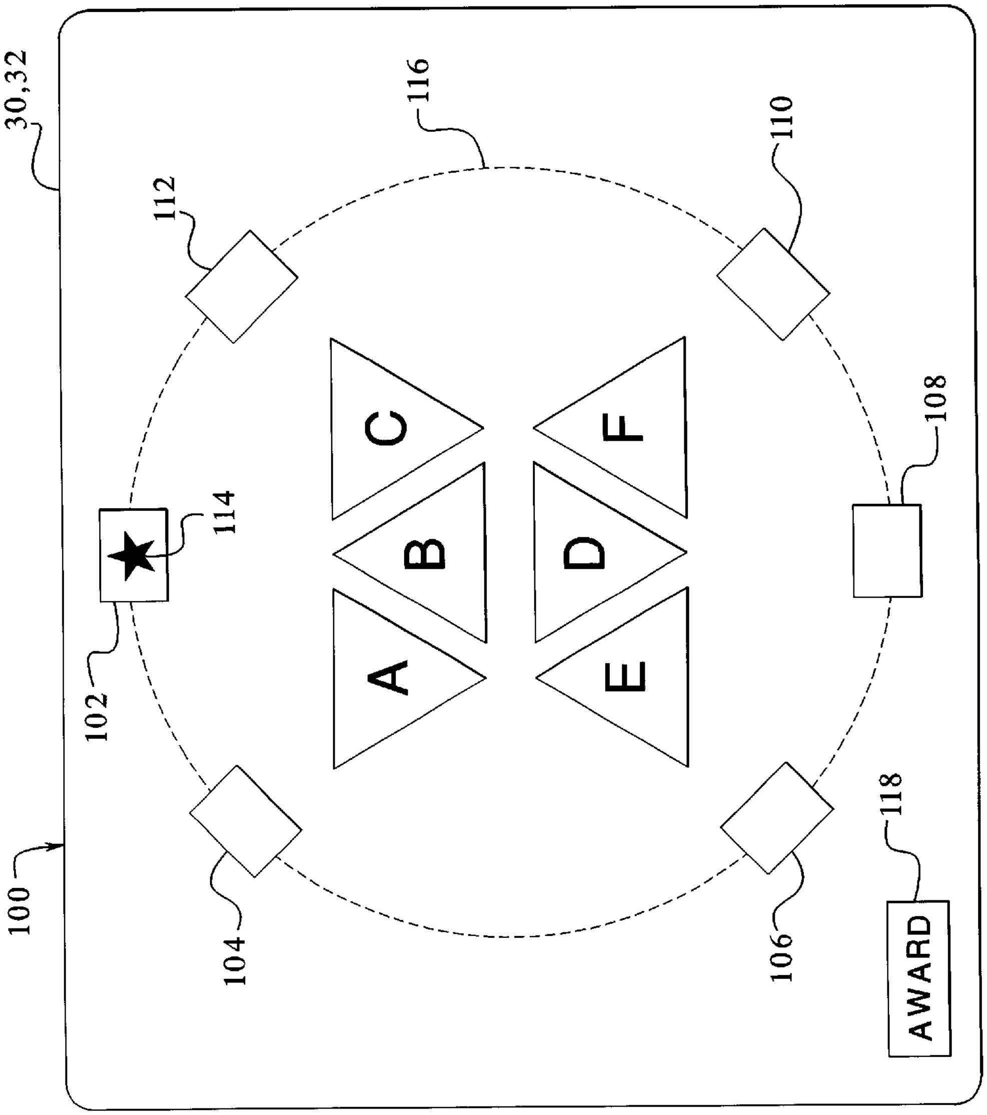
FIG. 3 is a front elevation view of a display device of FIGS. 1A and 1B illustrating a position movement embodiment of the present invention.

Referring now to FIG. 3, the display device 30 or 32 illustrates a display 100 of one implementation of the present invention. The display 100 includes six choices or selections labeled choices "A" through "F." The choices are illustrated as adjacent triangles, but alternatively have any shape, spatial relationship or suitable expression desired by the implementor. The choices "A" through "F" are preferably player selectable areas of a touch screen 50 connected to an associated touch screen controller 52, such that each choice sends a separate input to the processor 38 (see FIG. 2). Alternatively, the choices "A" through "F" are one or more player selectable electromechanical pushbuttons mounted to the face of the gaming device 10, such as the play button 20, bet one button 24 and cash out button 26, which send discrete inputs to the processor 38.

The display 100 also includes a plurality of different positions 102, 104, 106, 108, 110 and 112 and a marker 114. The marker 114, here a star, moves from position to position preferably along a path 116, which is suitably displayed to the player. The path 116 includes any path and does not have to include the positions 102 through 112 in any particular order. The marker 114 moves in any direction desired by the implementor. Alternatively, the positions 102 through 112 move or rotate, while the marker 114 remains fixed. This implementation includes any type of motion and any manner of highlighting or designating one of the positions, such as using a marker 114. In the display 100, the marker or star 114 moves in a counterclockwise manner from the position 102 to the position 104 to the position 106 to the position 108, etc.

The game enables the player, at certain times, to select any one of the choices "A" through "F," whereby the touch screen 50 (FIG. 2) or electromechanical input device sends an input to the processor 38. At certain times, such as when the game is displaying an outcome of a choice, the game does not send an input upon a player's selection. The player instead waits for a prompt or for a sequence to end. In the display 100, the game preferably does not send more than one input from the same choice. Once a player selects "A," sending a discrete input to the processor 38, the choice "A" is preferably thereafter spent or exhausted. Alternatively, the game enables the player to send the same input to the processor 38 until the game ends.

In the display 100, when the player selects a choice, the marker or star 114 may or may not move one or more counterclockwise positions. The apparatus and method for determining how many positions the marker moves is discussed in detail below. The star 114 may not move at all, the star may move all the way around the path 116 or the star may move any number of positions generated by the game. In the game of the display 100, the player selects choices until the star moves six positions and returns to its starting position, position 102, at which point the game ends. The six position moves are thus referred to herein as a "terminating condition" or "termination condition." The number of positions that the star has currently moved is referred to herein as a "count." The present invention contemplates any number of position moves, greater than one, ending the game.

Until the item or star moves six positions, i.e., until the count satisfies the termination condition, the game provides the player with an award after every discrete input to the processor 38. The apparatus and method for determining the award is described in detail below. In one example, the player pushes "C," the star 114 moves counterclockwise two positions to the position 106, and the game awards the player ten credits. The player pushes "A," the star 114 does not move, and the game awards the player five more credits. The player pushes "D," the star 114 moves three positions to the position 112, and the game awards the player two more credits. The player pushes "F," the star 114 moves one position to the original position 102, satisfies the game termination condition, whereby the game does not award a credit and the game ends. The player wins a total of 17 credits in the game, which the game preferably updates and displays in an award meter 118, wherein the award meter is preferably simulated and alternatively electromechanical.

The awards of the present invention include any item of value that the game implementor desires to provide, including game credits or game modifiers such as multipliers, wherein the game multiplies the multiplier by a bet, a payline win, a total win or a win from another game of the gaming device. The awards also include a number of picks from a prize pool or any other item of value.

The present invention contemplates structuring the choices, such that the player chooses in a predetermined order, e.g., "A" then "B" then "C," etc. Alternatively, the present invention contemplates enabling the player to choose and send discrete inputs in any order, as illustrated in the example above. The number of movements may be pre-assigned to selections, randomly determined or determined depending on the player's pick number or order.

Figure 4:
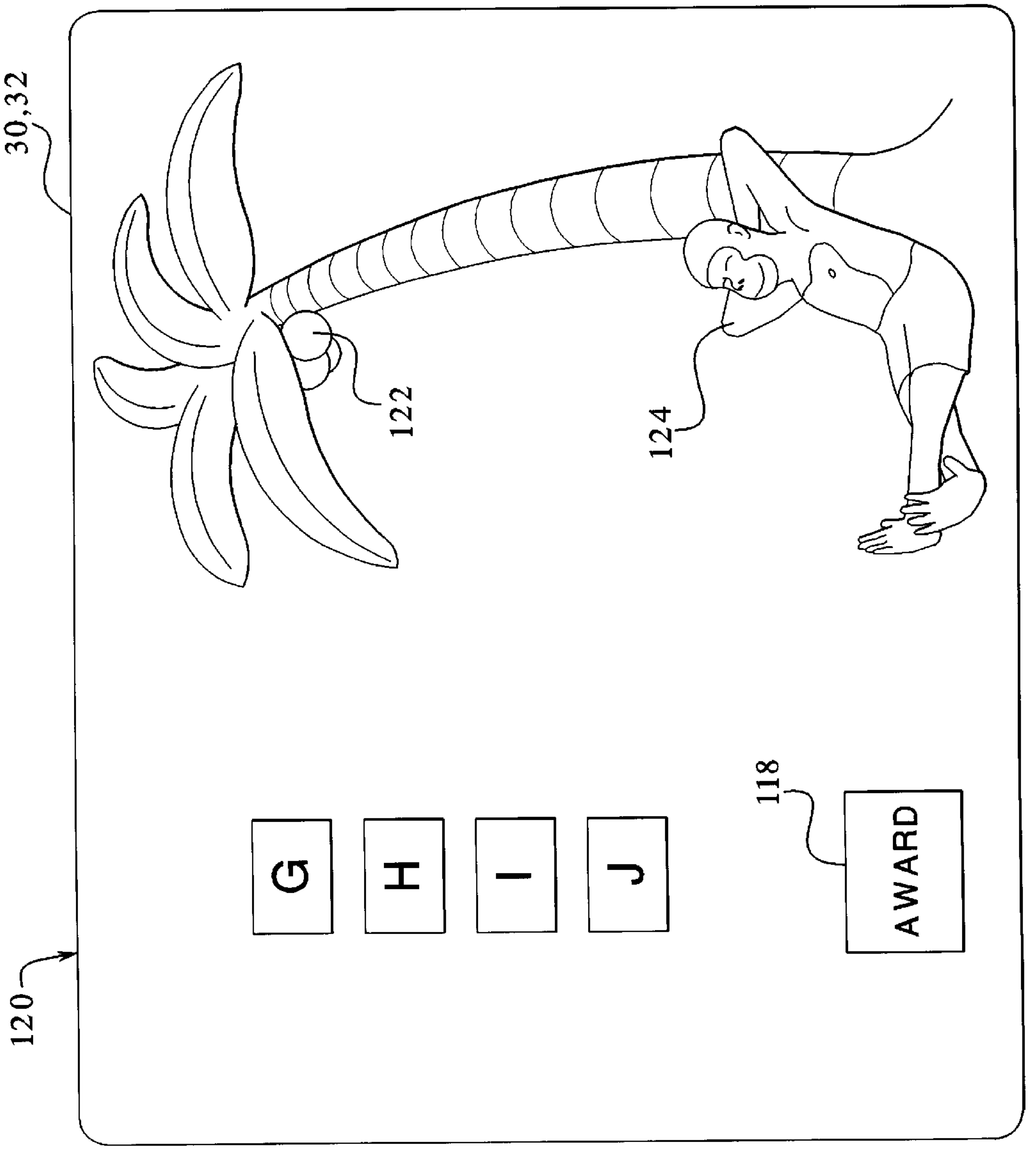
FIG. 4 is a front elevation view of a display device of FIGS. 1A and 1B including player selectable components of an item accumulation embodiment of the present invention.

Referring now to FIG. 4, the display device 30 or 32 includes components of another display 120 of the present invention. The display 120 includes four choices labeled choices "G" through "J." The choices are illustrated as adjacent squares and may alternatively have any shape, spatial relationship or expression desired by the implementor. The choices "G" through "J" are preferably player selectable areas of a touch screen 50 (FIG. 2), but alternatively are one or more player selectable electromechanical pushbuttons mounted to the face of the gaming device 10. The display 120 also includes a plurality of a items 122, which are illustrated here as a plurality of coconuts.

In the display 120, the game enables the player, at certain times, to select any one of the choices "G" through "J," whereby the touch screen or electromechanical input device sends an input to the processor 38. When the player selects a choice, one or more items or coconuts 122 may or may not fall and/or accumulate onto an object 124. The apparatus and method for determining how many items fall or accumulate is discussed in detail below. No coconuts may fall, one coconut may fall or any number of coconuts desired by the implementor may fall.

In the game of the display 120, the player selects choices until the three items or coconuts 122 fall which satisfies the game ending condition and in this example wakes the sleeping monkey 124. The termination condition for this embodiment is thus the accumulation of three items or coconuts. The present invention includes any termination condition or any number of items or coconuts 122 to wake the monkey 124. Until the count meets, exceeds or satisfies the termination condition, the game provides the player with an award after every discrete input to the processor 38. The apparatus and method for determining the award is described in detail below.

In one example, the player pushes "J." three items or coconuts 122 drop and wake the monkey 124, and the game ends. In a stand alone game, the present invention contemplates not providing the player any award upon a satisfied game termination condition, or alternatively an award less than the player's wager upon a satisfied game termination condition. In a bonus round, the game preferably provides an award upon the completion of the game or alternatively when the game ends after the player's first choice, i.e., after a first input is sent to the processor 38. The display 120 contemplates an award being of any type described above.

The present invention includes structuring the choices in the display 120, such that the player chooses in a predetermined order, e.g., "G" then "H" then "I," etc. Alternatively, the present invention includes enabling the player to send discrete inputs in any order, e.g., "I," "G," "H," etc.

Both the displays 100 and 120 provide a visual representation of an accumulation of randomly generated components, which is described in more detail below. The display 100 accumulates changes in position. The display 120 accumulates items that have gone though some transformation. The display 120 includes alternatively setting a non-zero count and subtracting items from the count until meeting or falling below a termination condition. In one example, the game begins with the monkey having five bananas, i.e., having a count of five. After each choice, the monkey eats none or one or more bananas. When the monkey eats all five bananas, the game ends. In a subtraction embodiment, the game subtracts from a count down to a termination condition of zero. It should be appreciated that from the foregoing examples, game designers of ordinary skill in the art can develop endless other ways to represent the counting out of a generated component having a varying probability of ending the game, e.g., via position movement, item accumulation or item depletion.

Component Generation Databases

Referring now to FIGS. 5A through 5F, component generation databases 130, 132, 134, 136, 138 and 140 each have a column 142 of game selectable components and a column 144 of associated probabilities. Each component generation database is associated with a choice from the display 100 of FIG. 3. The component generation database 130 of FIG. 5A is associated with the choice "A" of the display 100; the component generation database 136 of FIG. 5B is associated with the choice "B" of the display 100, etc. In one embodiment, the present invention includes a separate component generation database for each choice; however, the present invention alternatively employs one component generation database for a plurality of or for all of the choices.

As seen in FIGS. 5A to 5E, each component generation database includes the numbers 0 through 5 in the component column 142 and probabilities adding to 100% in the probability column 144. The display 100 of FIG. 3 has a termination condition of six position moves, i.e., requires six position moves to satisfy the condition and end the game, wherein the component columns 142 only provide up to five position moves. In this manner, the game of the display 100 guarantees the player an award because the game, at most, generates a move of five positions.

In the example provided above in connection with the display 100, when the player pushed "C," the star moved two positions because the game invoked the number database 134 and randomly generated "two moves" from the component column 142, which had a twelve percent generation chance in the probability column 144. When the player pushed "A," the star did not move because the game invoked the component database 130 and randomly generated "zero moves" from the component column 142, which had a thirty percent generation chance in the probability column 144. When the player pushed "D," the star moved three additional positions because the game invoked the component database 136 and randomly generated the "three moves" from column component 142, which had a thirty percent generation chance in the probability column 144. When the player pushed "F," the star moved one position, to the final position, satisfying the termination condition, despite the game invoking the component database 140 and randomly generating "six moves" from the component column 142, which had a 100 percent generation chance in the column 144.

The game contemplates ending when the accumulated generated components meet, exceed or satisfy the termination condition. In the above example, when the player pushed "F," and the game randomly generated the "six moves" from the component column 142, the count accumulated to eleven. Since only one more number was needed to satisfy the termination condition, the star moved only one position, to the final position. The star alternatively moves the total number of generated positions. In the coconut accumulation display 120, if a player inputs a choice and the game generates a number of coconuts greater than the three necessary to wake the monkey, the game displays all the generated coconuts falling and hitting the monkey or alternatively displays only the three necessary to wake the monkey.

The component generation databases 130 through 140 of FIGS. 5A through 5F, preferably structure the probabilities of the column 144 such that the databases progressively increase the chance that the game generates a component having a greater likelihood of satisfying the termination condition and ending the game. That is, the higher percentages of the probability column 144 are at the top of the databases 130 and 132, which include lower likelihood components, i.e., 0, 1 and 2, while the higher percentages of the probability column 144 are at the bottom of the databases 136 and 138, which include higher likelihood components, i.e., 3, 4 and 5. The present invention thereby preferably designates the player's choice order or assigns the databases to the player's selection order, such that the player is only initially able to select an input device associated with the database 130, an input device associated with the database 132 second, an input device associated with the database 134 third, etc. In the example provided above in connection with the display 100 of FIG. 3, the present invention includes assigning the database 130 to the player's first selection, the database 132 to the player's second selection etc. The game alternatively requires the player to select the touch screen choices in the order "A," "B," "C," "D," "E" and "F."

As seen in FIG. 5F, the database 140 illustrates that the present invention preferably includes one database, wherein a game ending selection is guaranteed. There is a one hundred percent chance that the player receives a six position move when the player selects the choice associated with the database 140. As stated above, the game preferably structures the choices such that the player selects this choice last. It is conceivable that the game randomly generates zero position moves in the first five selections. The database 140 guarantees that the game ends upon the sixth pick.

While the description of FIGS. 5A through 5F includes the display 100 of FIG. 3, it should be appreciated that the implementor likewise assigns one or more similar databases to the display 120 of FIG. 4. Instead of generating position moves, the databases assigned to the choices "G," "H," "I" and "J" of the display 120 generate items that the game accumulates or decreases towards a game termination condition.

Award Database

Referring now to FIG. 6, an award generation database 150 has a column 152 of game selectable awards and a probability column 154 indicating the likelihood that an associated award is selected. The present invention preferably associates an award generation database with the display 100 of FIG. 3, the display 120 of FIG. 4 or any other display used to implement the present invention. The award generation database 150 includes the award column 152 and the probability column 154 having any distribution desired by the implementor. The types of awards are described above. The awards sequentially increase, alternatively decrease or further alternatively stay the same. The probabilities likewise sequentially increase, alternatively decrease or further alternatively stay the same.

The game includes generating an award only once or generating the same award a plurality of times. In the display 100 of FIG. 3, there is the same number of choices "A" through "F" and associated position move databases 130 though 140 as there are awards in the award generation database 150. In the display 120 of FIG. 4, there are less choices "G" through "J" as there are awards in the database 150. The present invention includes the same, alternatively more or further alternatively less awards than the number of choices or component generation databases.

In one embodiment, the present invention is predetermined or programmed to associate a particular award from the award column 152 with a particular choice, such that when a player selects a choice and the game generates a component from the component database, the game, if it provides an award, provides the associated award. In this embodiment, the game does not randomly generate an award and therefore does not employ the probability column 154.

For example, the game can associate: (i) the "two" award from the award column 152 with the choice "E"; (ii) the "three" award with the choice "A"; (iii) the "four" award with the choice "B"; (iv) the "five" award with the choice "D"; (v) the "ten" award with the choice "C;" and (vi) the "twenty" award with the choice "F." In this embodiment, the game preferably assigns awards to particular selections, as described above, such that later choices include higher valued awards. As stated above, the game includes providing an award upon a game ending input and alternatively does not do so.

In another embodiment, the game randomly generates an award for each choice. The game includes employing or not employing the probability column 154 when randomly generating an award for each choice. The game includes randomly generating the awards before, during or after the player's selections and preferably does so before. Again, the game includes randomly generating or alternatively not generating the same award from the award column 152 two or more times.

In a further embodiment, the game provides a plurality of award databases, such as database 150, having varying probabilities of generating the awards therein. The game assigns different databases to different selections such as selection one, selection two, etc. The game contemplates structuring the probabilities in the column 1549 such that later selections, on average, randomly produce higher awards.

In a further embodiment, the awards are related to the varying probabilities or moves. The awards could be equal or unequal to the probabilities or moves.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. A gaming device having a bonus game comprising:

a termination condition including a plurality of components;

a plurality of selectable choices, each of said choices having a probability of contributing zero, one or more components toward the termination condition, wherein the probability of the choices contributing said components toward the termination condition is dependent on the order of selection of the choices; and a processor which ends the bonus game when the contributed components from said choices selected satisfy said termination condition.

2. The gaming device of claim 1, wherein said components are weighted such that at least one component is more likely to be randomly generated than at least one other component.

3. The gaming device of claim 1, wherein the probabilities are weighted such that later selected choices, on average, generate components having a greater likelihood of satisfying said terminating condition.

4. The gaming device of claim 1, wherein the probability associated with at least one said choices for contributing one of the components is zero.

5. The gaming device of claim 1, which includes an award associated with each choice.

6. The gaming device of claim 5, wherein one award is randomly associated with each choice selection.

7. The gaming device of claim 1, which includes means in communication with the processor for enabling a player to select said selectable choices.

8. The gaming device of claim 7, wherein said player section means includes a display device having a touch screen.

9. The gaming device of claim 8, wherein the gaming device includes a cabinet and said processor being remote from the cabinet.

10. The gaming device of claim 9, wherein the processor is at a central location.

11. The gaming device of claim 7, wherein said player selection means includes a plurality of electromechanical input devices.

12. The gaming device of claim 1, which includes a display device which to communicates with said processor, wherein said choices are displayed by said display device and said choices are player selectable.

13. The gaming device of claim 12, which includes a path having a plurality of positions displayed by said display device, wherein each component includes a number of position changes along said path.

14. The gaming device of claim 12, which includes a path having a plurality of positions displayed by said display device, wherein said termination condition includes a net change of positions along said path.

15. The gaming device of claim 12, which includes a plurality of items displayed by said display device, wherein each said component includes an addition or subtraction of at least one item.

16. The gaming device of claim 12, which includes a plurality of items displayed by said display device, wherein said termination condition includes a net addition or subtraction of items.

17. The gaming device of claim 1, which includes an award provided to a player when the contributed components from said choices selected satisfy said termination condition.

18. The gaming device of claim 17, wherein the award is based on the number of selected choices picked by the player before the contributed components from said choices selected satisfy said termination condition.

19. The gaming device of claim 1, which includes an award associated with each selected choice before the contributed components from said choices selected satisfy said termination condition.

20. The gaming device of claim 19, wherein each selected choice has a larger value than the previously selected choice.

21. A gaming device having a bonus game comprising:

a termination condition including a plurality of components;

a plurality of selectable choices, each of said choices having a probability of contributing zero, one or more components toward the termination condition, wherein the probability of the choices contributing said components toward the termination condition is dependent on the order of selection of the choices; and a processor which provides an award to the player and ends the bonus game when the contributed components from said choices selected satisfy said termination condition.

22. The gamine device of claim 21, where the award is based on the number of choices selected before the choices selected satisfy the termination condition.

23. The gaming device of claim 21, wherein said components are weighted such that at least one component is more likely to be randomly generated than at least one other component.

24. The gaming device of claim 21, wherein the probabilities are weighted such that later selected choices, on average, generate components having a greater likelihood of satisfying said terminating condition.

25. The gaming device of claim 21, wherein the probability associated with at least one said choices for contributing one of the components is zero.

26. A gaming device having a bonus game comprising:

a termination condition including a plurality of components;

a plurality of selectable choices, each of said choices having a probability of contributing zero, one or more components toward the termination condition, wherein the probability of the choices contributing said components toward the termination condition is dependent on the order of selection of the choices;

an award associated with each selectable choice; and a processor which provides the award associated with each choice selected prior to ending the bonus game when the contributed components from said choices selected satisfy said termination condition.

27. The gaming device of claim 26, wherein said components are weighted such that at least one component is more likely to be randomly generated than at least one other component.

28. The gaming device of claim 26, wherein the probabilities are weighted such that later selected choices, on average, generate components having a greater likelihood of satisfying said terminating condition.

29. The gaming device of claim 26, wherein the probability associated with at least one said choices for contributing one of the components is zero.

30. A gaming device having a bonus game comprising:

a termination condition including a plurality of components;

a plurality of selectable choices, each of said choices having a varying probability of contributing a number of components toward the termination condition, wherein the varying probability of the choices contributing said components toward the termination condition is dependent upon the order of selection of the choices; and a processor which ends the bonus game when the contributed components from said choices selected satisfy said termination condition.

31. The gaming device of claim 30, wherein said components are weighted such that at least one component is more likely to be randomly generated than at least one other component.

32. The gaming device of claim 30, wherein the probabilities are weighted such that later selected choices, on average, generate components having a greater likelihood of satisfying said terminating condition.

33. The gaming device of claim 30, wherein the probability associated with at least one said choice for contributing one of the components is zero.

34. The gaming device of claim 30, which includes an award provided to the player which is associated with said selected choices.

35. A method for operating a game of a gaming device, said method comprising the steps of:

(a) displaying a plurality of choices;

(b) enabling a player to select one of the choices;

(c) determining a number of components of a terminating condition contributed by said selected choice based on a probability associated with said selected choice, wherein said components are randomly generated from a plurality of components associated with the order of said selection;

(d) ending said game if all of the components of the terminating condition are contributed by the selected choices; and (e) repeating steps (b) to (d) until the game ends.

36. The method of claim 35, which includes the step providing an award to the player for each selected choice.

37. The method of claim 35, which includes the step of providing a randomly determined award to the player for each selected choice.

38. The method of claim 35, wherein the step of determining if one or more components is associated with a selected choice includes randomly generating said components from a plurality of components, wherein each of said components has an associated likelihood of being generated.

39. The method of claim 35, wherein the steps of the method are controlled by a processor and stored on a storage medium accessed by the processor.

40. A method for operating a game of a gaming device, said method comprising the steps of:

(a) displaying a plurality of choices through a display device;

(b) setting a count;

(c) enabling a player to select one of the choices;

(d) generating a component upon a player's selection of one of the choices, wherein said component is randomly generated from a plurality of components associated with the order of said selection;

(e) updating said count based on said component;

(f) ending said game if said updated count satisfies a game termination condition;

(g) repeating steps (c) to (f) until the game ends.

41. The method of claim 40, which includes providing an award to said player for each selected choice.

42. The method of claim 40, which includes enabling said player to selected said choices in a predetermined order.

43. The method of claim 40, wherein the step of generating the component includes randomly generating said component from a plurality of components, wherein each of said components has a varying probability of being generated.

44. A gaming device having a bonus game comprising:

a termination condition including a plurality of components;

a plurality of player selectable choices, wherein each of said choices has a probability of contributing zero, one or more components toward the termination condition;

a path having a plurality of positions, wherein each component includes a number of position changes along said path;

a display device adapted to display said choices and said path; and a processor in communication with said display device which ends the bonus game when the contributed components from said choices selected satisfy said termination condition.

45. A gaming device having a bonus game comprising:

a path having a plurality of positions;

a termination condition including a plurality of components, wherein said termination condition includes a net change of positions along said path;

a plurality of player selectable choices, wherein each of said choices has a probability of contributing zero, one or more components toward the termination condition;

a display device adapted to display said choices and said path; and a processor in communication with said display device which ends the bonus game when the contributed components from said choices selected satisfy said termination condition.

46. A gaming device having a bonus game comprising:

a plurality of items;

a termination condition including a plurality of components, wherein each said component includes an addition or subtraction of at least one item;

a plurality of player selectable choices, each of said choices having a probability of contributing zero, one or more components toward the termination condition;

a display device adapted to display said choices and said items; and a processor in communication with said display device which ends the bonus game when the contributed components from said choices selected satisfy said termination condition.

47. A gaming device having a bonus game comprising:

a plurality of items;

a termination condition including a plurality of components, wherein said termination condition includes a net addition or subtraction of items;

a plurality of player selectable choices, each of said choices having a probability of contributing zero, one or more components toward the termination condition;

a display device adapted to display said choices and said items; and a processor in communication with said display device which ends the bonus game when the contributed components from said choices selected satisfy said termination condition.

48. A gaming device having a bonus game comprising:

a termination condition including a plurality of components;

a plurality of selectable choices, each of said choices having a probability of contributing zero, one or more components toward the termination condition;

an award associated with each selected choice before the contributed components from said choices selected satisfy said termination condition; and a processor which ends the bonus game when the contributed components from said choices selected satisfy said termination condition.

49. The gaming device of claim 48, wherein each selected choice has a larger value than the previously selected choice.

50. A gaming device having a bonus game comprising:

a termination condition including a plurality of components;

a plurality of selectable choices, each of said choices having a probability of contributing zero, one or more components toward the termination condition; and a processor which provides an award to the player and ends the bonus game when the contributed components from said choices selected satisfy said termination condition, wherein the award is based on the number of choices selected before the choices selected satisfy the termination condition.

51. The gaming device of claim 50, wherein said components are weighted such that at least one component is more likely to be randomly generated than at least one other component.

52. The gaming device of claim 50, wherein the probabilities are weighted such that later selected choices, on average, generate components having a greater likelihood of satisfying said terminating condition.

53. The gaming device of claim 50, wherein the probability associated with at least one said choices for contributing one of the components is zero.

54. A method for operating a game of a gaming device, said method comprising the steps of:

(a) displaying a plurality of choices;

(b) enabling a player to select one of the choices;

(c) determining a number of components of a terminating condition contributed by said selected choice based on a probability associated with said selected choice, wherein said components are randomly generated from a plurality of components and each of said components has an associated likelihood of being generated;

(d) ending said game if all of the components of the terminating condition are contributed by the selected choices; and (e) repeating steps (b) to (d) until the game ends.

55. The method of claim 54, which includes the step providing an award to the player for each selected choice.

56. The method of claim 54, which includes the step of providing a randomly determined award to the player for each selected choice.

57. The method of claim 54, wherein the steps of the method are controlled by a processor and stored on a storage medium accessed by the processor.

* * * * *